United States Patent [19]
Cairns et al.

[11] Patent Number: 5,873,750
[45] Date of Patent: Feb. 23, 1999

[54] UNDERWATER CONNECTOR ASSEMBLY

[75] Inventors: James L. Cairns; Stewart M. Barlow, both of Ormond Beach, Fla.

[73] Assignee: Ocean Design, Inc., Ormond Beach, Fla.

[21] Appl. No.: 856,927

[22] Filed: May 15, 1997

[51] Int. Cl.⁶ .................................................. H01R 13/40
[52] U.S. Cl. ........................................................... 439/587
[58] Field of Search .................................. 439/587, 589, 439/274, 275, 279

[56] References Cited

U.S. PATENT DOCUMENTS

| | | | |
|---|---|---|---|
| 4,203,640 | 5/1980 | Bice et al. | 439/139 |
| 4,373,767 | 2/1983 | Cairns | 439/275 |
| 4,606,603 | 8/1986 | Cairns | 385/50 |
| 4,666,242 | 5/1987 | Cairns | 385/75 |
| 4,682,848 | 7/1987 | Cairns et al. | 385/69 |
| 4,887,883 | 12/1989 | Darbut et al. | 385/56 |
| 4,959,022 | 9/1990 | Neuroth | 439/738 |
| 5,203,805 | 4/1993 | Cairns | 439/199 |
| 5,358,418 | 10/1994 | Carmichael | 439/190 |
| 5,515,465 | 5/1996 | Olin et al. | 385/64 |

FOREIGN PATENT DOCUMENTS

| | | |
|---|---|---|
| 0 186 599 | 7/1986 | European Pat. Off. . |
| WO 86/02173 | 4/1986 | WIPO . |
| WO 96/22554 | 7/1996 | WIPO . |
| WO 96/22617 | 7/1996 | WIPO . |

*Primary Examiner*—Gary F. Paumen
*Assistant Examiner*—T. C. Patel
*Attorney, Agent, or Firm*—Brown, Martin, Haller & McClain, LLP

[57] ABSTRACT

An underwater connector assembly includes releasably mateable plug and socket units, each unit having at least one bore for receiving an optical or electrical lead connected to a terminal at a forward end of the bore, the terminals being mated when the units are connected together. A shaft extends from one terminal through the bore to form an annular chamber between the shaft and bore. An annular seal of resilient material is mounted in the annular chamber between the shaft and bore. The seal has an inner diameter less than the outer diameter of the shaft and an outer diameter greater than the bore diameter, and engages over a smooth, continuous outer cylindrical surface of the shaft, allowing the shaft to slide relative to the seal on mating of the plug and receptacle units while maintaining sealing engagement between the seal and shaft.

16 Claims, 3 Drawing Sheets

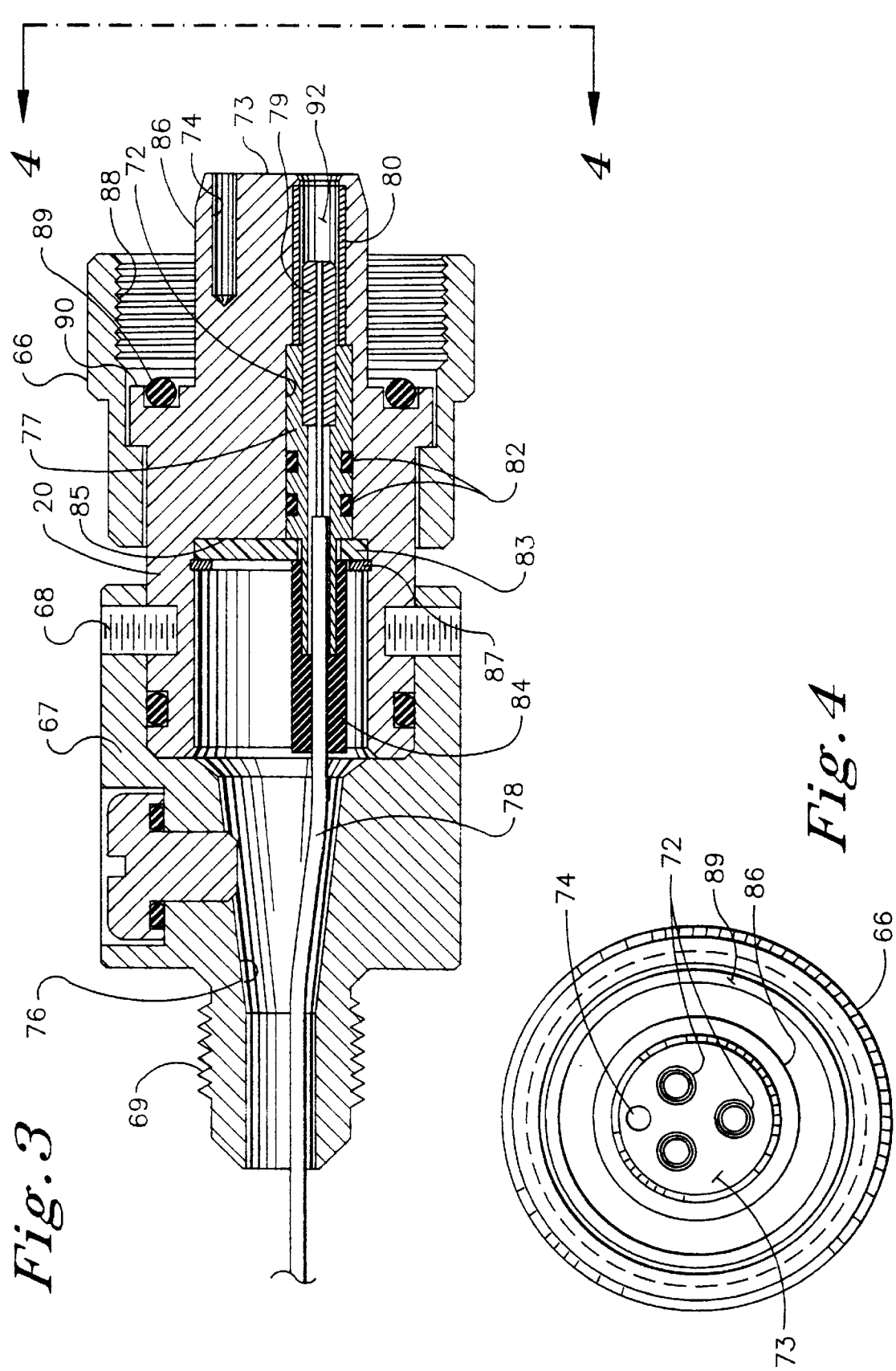

UNDERWATER CONNECTOR ASSEMBLY

BACKGROUND OF THE INVENTION

The present invention relates generally to dry and wet mateable underwater connectors, and is particularly concerned with an improved underwater seal assembly for the pin/socket junction elements of fiber-optical and electrical connectors which seals against pressure while permitting compliance of the optical junctions.

There are presently on the market connectors for simultaneously joining multiple electrical and/or fiber-optical circuits in a dry environment with subsequent immersion to great ocean depths. There are similar connectors which, when pre-treated with a bit of optical matching gel, which may also act as a dielectric, can be successfully mated once or at most a few times underwater. All of the connectors of these sorts have the challenge that they must seal against high pressures while providing low-loss optical transmission.

The challenge has, until now, not been adequately answered. The problem has been that the same traditional sealing techniques that render the assemblies pressure proof also cause them to rigidly grasp the pin and socket elements that are housed within them. To achieve low-loss optical junctions, the contacting elements within the connectors must be free to adjust geometrically to each other such that their cores, through which light is transmitted, are precisely aligned. Each pin/socket generally has an individual alignment device that is independent on a small scale from the alignment of the overall connector housings. That is, gross alignment of the elements is achieved by the relative positions of the housings. But final alignment of the contacts must take place locally at each individual pin/socket junction. If that final alignment is inhibited, as it is in current products on the market, by the pin/socket sealing means, then imperfect alignment with concomitant poor light transmission will result. The present invention addresses and solves this problem through the employment of low-stress gland seals that permit compliant mounting of the pin/socket elements while sealing against high pressure.

A typical underwater connector for sealably connecting a plurality of fiber-optical and/or electrical circuits comprises a plug unit and a receptacle unit which are releasably securable together either on land prior to submerging the connector, or, in a slightly changed form, underwater.

The plug unit typically contains a plurality of contact probes or pins to which fiber-optic or electrical leads are terminated. The receptacle unit contains a corresponding number of sockets into whose terminal ends a corresponding number of fiber-optic or electrical leads are terminated. The probes or pins are mated with the sockets when the two units are coupled together. As the plug and receptacle are coupled together, the contact pins must mate with the respective sockets. The optical circuits of such connectors, until now, have been of limited use due to the fact that their mounting means have not been compliant enough to permit reliable low-loss junctions. Optical pins and sockets in such underwater connectors require sealing against high pressures, and have been fixed into bores to which they seal with O-rings. The result is a rather non-compliant assembly. But compliance is required on at least one side, pin or socket, for low optical loss: It allows each pin/socket junction to self align. The difficult problem, until now, has been to simultaneously provide adequate compliance and sealing against high pressure.

SUMMARY OF THE INVENTION

It is an object of the present invention to provide a new and improved seal assembly for the optical junctions of underwater plug and receptacle connectors. Electrical junctions, which may be housed in respective locations (bores) of the plugs and receptacles, require less compliance than optical junctions due to the fact that their pins and sockets do not need to be precisely aligned to achieve good low-loss connections. Electrical pin/socket assemblies may therefore be sealed by O-rings, or other conventional means.

According to the present invention, a connector assembly is provided which comprises a plug unit having at least one bore and at least one probe terminal slidably mounted in the bore, a receptacle unit having at least one bore and at least one socket terminal mounted in the bore for receiving the probe when the two units are mated together, a sleeve or hollow shaft extending from the plug probe through the bore, and an annular seal of resilient material mounted between the sleeve and bore for sealing the bore, the annular seal having an inner diameter less than the outer diameter of the sleeve and an outer diameter greater than the bore diameter, whereby the seal is compressed in both directions on mounting on the seal in the bore, and the sleeve being movable through the seal on mating of the plug and receptacle units while maintaining sealing engagement between the seal and sleeve.

The annular seal is preferably of the type known as a Morrison seal, and produces less stress than an O-ring seal while having improved sealing properties. If seawater should enter either the mating-face or terminal ends of the connector via leakage into the cables or seals, for example, it will impinge against the end face of the seal. However, since the seal is compressed both inwardly and outwardly when in position between the sleeve and bore, and the seawater will exert the same ambient pressure inwardly at the outer edge of the seal as outwardly at the inner edge of the seal, the ambient sea pressures will cancel out and the seawater will not pass the seal. Thus, this seal has the advantage of providing excellent sealing qualities while still providing the necessary freedom of movement of the pin or probe shaft or sleeve.

Preferably, the plug unit has a plurality of optical and/or electrical probes for mating with a corresponding number of sockets in the receptacle unit, and each optical probe is secured to a shaft or sleeve sealed in a bore by an identical annular seal member permitting the shaft to slide through the seal member as the units are connected without reducing the effectiveness of the seal. An optical fiber extends through each sleeve or shaft and is terminated at the probe or receptacle end wall. The seal member has a cylindrical or otherwise regularly formed smooth inner surface which engages over a smooth, cylindrical (or correspondingly regularly formed) outer surface of the shaft.

Preferably, tubular metal bushings are mounted on the sleeve or shaft at opposite ends of the Morrison-type seal member and the seal member is compressed between an end wall of the bore and the spring. The Morrison-type seal will prevent leakage of seawater past the seal in the event of a cable or connector malfunction or leakage. At the same time, the optical fiber shaft or sleeve over which the seal is mounted will be able to slide through the seal as the plug and socket are coupled together, while still maintaining a good seal, unlike an O-ring seal which would create drag resisting such movement.

The functional performance of these sealing means for dry-mateable underwater connectors, as well as an understanding of how the resulting connectors, with no modifications other than slightly different techniques of assembly, can be mated sub-sea, will be understood from the following drawings and their descriptions.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which:

FIG. 3 is a longitudinal cross-section through a socket body for releasable mating engagement with the plug body of FIG. 1;

FIG. 4 is a front end view of the socket body in the direction 4—4 of FIG. 3.

DESCRIPTION OF THE PREFERRED EMBODIMENTS

FIGS. 1–5 illustrate a plug and socket connector assembly according to a preferred embodiment of the invention which may be used as an underwater connector for optical fibers and/or electrical leads. The plug and socket bodies in the illustrated embodiment are designed to connect three optical fibers, but it will be understood by those skilled in the field that a greater or lesser number of optical fibers may be connected in this way, either alone or in addition to conventional electrical junctions in an electro-optical connector assembly. The plug and socket assembly in the illustrated embodiment is designed to be connected on dry land prior to submerging the entire connection. However, it will be understood that similar seal arrangements may be used in underwater mateable connectors as well.

Figure 2:
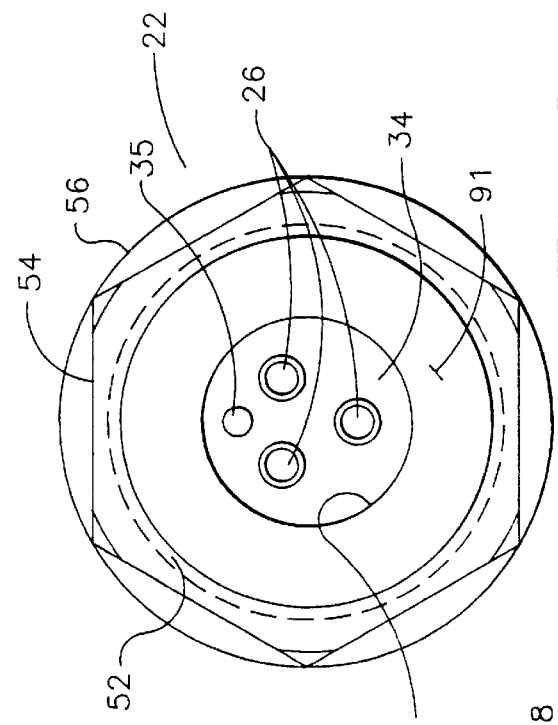
FIG. 2 is a front end view of the plug body of FIG. 1 in the direction 2—2 of FIG. 1.
Figure 1A:
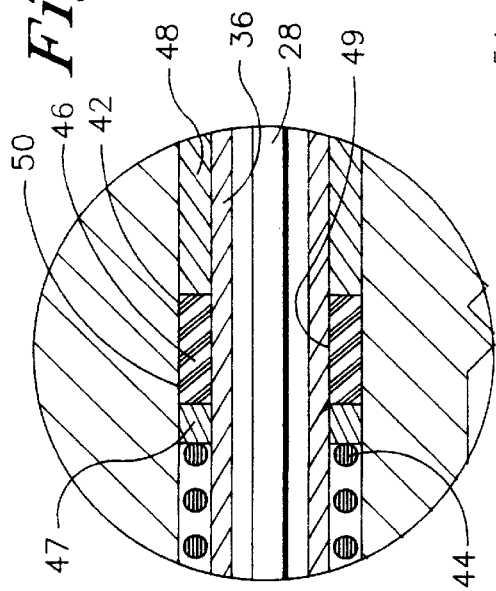
FIG. 1A is an enlarged view of the seal assembly of FIG. 1.
Figure 1:
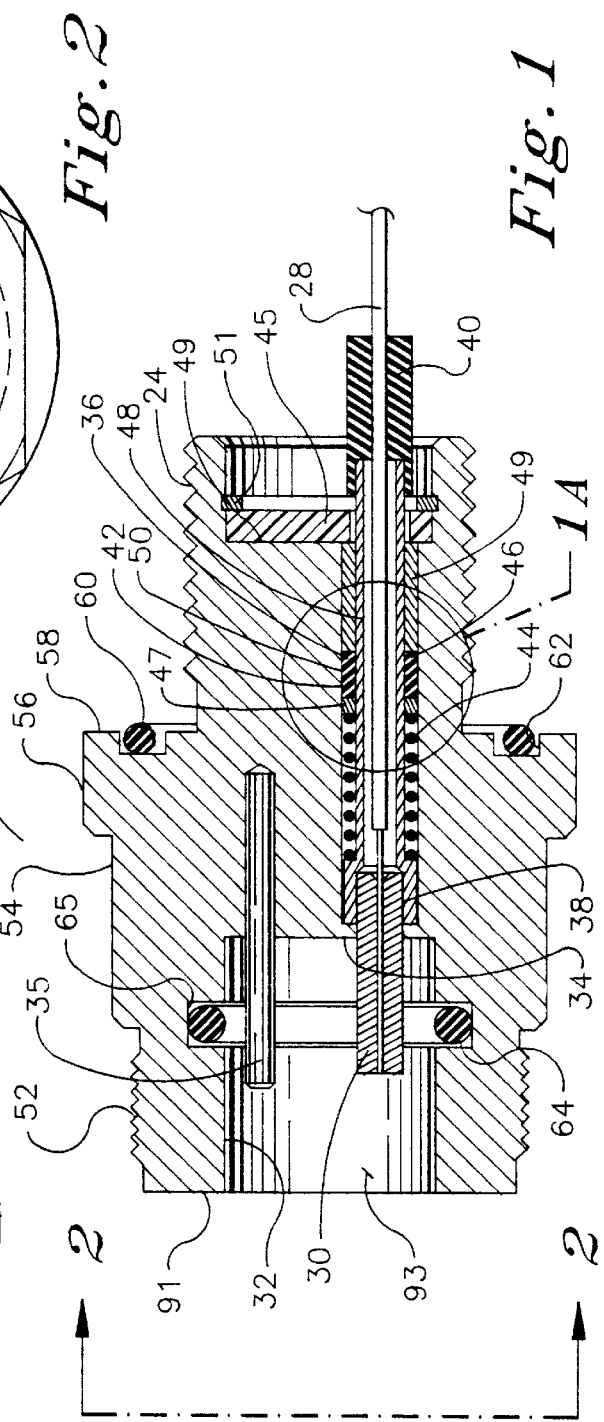
FIG. 1 is a longitudinal cross-section through a plug body forming part of a connector assembly according to a preferred embodiment of the present invention.

FIGS. 1, 1A and 2 illustrate a plug body 22 which has a first or rear threaded end portion or shaft 24 for threaded engagement in a bulkhead opening, or for coupling to the end of a cable in a conventional manner, as will be understood by those skilled in the field. The body 22 has a plurality of through bores 26, each of which receives a fiber-optic lead 28 (or a conventional electrical lead not illustrated) which is terminated in a respective ferrule or probe 30 at the front end of the body. As illustrated in FIG. 1, the body 22 has an enlarged counterbore 32 projecting inwardly at its forward end up to an end wall 34 through which each of the probes 30 project. An alignment pin 35 also projects outwardly from the counterbore end wall 34, and extends beyond contacts 30. Each fiber-optic lead 28 comprises a buffered fiber which extends through a cylindrical guide sleeve 36 in bore 26 up to and through the ferrule 30, which is secured in an enlarged head 38 at the forward end of sleeve 36 which forms a ferrule seat. The ferrule acts as a terminal for the fiber. Sleeve 36 extends out of bore 26 at its rear end and terminates in a strain relief/boot seal 40 at the rear end of the plug body, and the space between the sleeve and buffered fiber 28 is typically filled with epoxy.

A seal assembly 42 is provided between the outer surface of guide sleeve 36 and the inner surface of the through bore 26. A spring 44 extends between the enlarged head 38 and bushing 47 of the sleeve assembly 42, allowing for some freedom of movement of the probe and sleeve so that the probe can be pushed back into the plug body as the connection is made. This helps in making alignment corrections and ensuring that a good connection is made as the plug and socket bodies are secured together, as will be explained in more detail below.

The seal assembly 42 is arranged such that the sleeve 36 can slide through the assembly 42 as the probe 30 is pushed back into the plug body to compress spring 44, and as the probe moves back out when the plug is disconnected, while still maintaining a good sealing engagement between the sleeve and seal and between the seal and plug bore 26. Seal assembly 42 is held between spring 44 and an end plate 45 extending over the rear ends of all of the bores 26 and having an opening 43 aligned with each bore and of smaller diameter than the bore, as illustrated in FIG. 1. Thus, the end plate 45 acts as a stop member or shoulder at the rear end of each bore 26 for holding the seal assembly in position. Plate 45 is held in place between end wall 49 of body 22 and retainer ring 51. As best illustrated in FIGS. 1 and 1A, the seal assembly 42 basically comprises a cylindrical seal member 46 of resilient material such as rubber mounted between a pair of cylindrical metal bushings 47,48, respectively.

Seal member 46 is preferably a type of seal known as a Morrison type seal, which is not seated in any annular groove on either the through bore 26 or cylindrical sleeve 36, but simply slides over the smooth, cylindrical outer surface of sleeve 36. A Morrison-type seal in an unstressed or uncompressed condition has a through bore 49 having an inner diameter which is smaller than the diameter of the part over which it is to be fitted, and an outer diameter 50 which is larger than the diameter of the bore into which it is to be fitted. Thus, the seal member 46 has an inner diameter smaller than the outer diameter of sleeve 36, and will be compressed or contracted in a radially outward direction when it is fitted over sleeve 36. At the same time, the seal will be compressed inwardly when it is fitted into bore 26 since it has an outer diameter larger than that of bore 26. The opposing compressive forces ensure that there is a good sealing engagement between both the seal and the sleeve 36, and between the seal and the bore 26, resisting any ingress of seawater into the connection. The properties of Morrison seals were described in a paper entitled "An Investigation of Cable Seals" by J. B. Morrison, *Applied Physics Laboratory, University of Washington*, Report #54-41, Mar. 1, 1954. The seal member 46 is not limited to the dimensions described in the aforementioned paper, but will be designed to provide sufficient sealing pressure to resist ingress of seawater, as will be understood by those skilled in the field.

The outer surface of plug member 22 includes a threaded forward end boss 52, an enlarged diameter hex nut portion 54, and a larger diameter annular flange 56 with an end face or shoulder 58 from which the threaded rear end portion 24 projects. An O-ring seal 60 is mounted in an annular groove 62 in end face 58. A further O-ring seal 64 is mounted in an annular groove 65 in counterbore 32 at the forward end of the plug body.

FIGS. 3 and 4 illustrate a receptacle or socket body 20 for releasable mating engagement with the plug body 22 of FIGS. 1 and 2. A coupling sleeve 66 is slidably mounted on the forward end of the receptacle body 20 for releasably securing the receptacle body to the plug body, as explained in more detail below. As an example of one means of terminating the receptacle, an oil-filled assembly is illustrated in FIG. 4. But those skilled in the art will understand that any number of other conventional termination means can be used. The rear end of the receptacle body is suitably coupled to a receptacle shell 67 via a socket head set 68 or the like. Shell 67 has a threaded rear end portion 69 which may be coupled directly to a cable terminal unit, or via a conventional swivel joint.

The receptacle body 20 has a series of through bores 72 equal in number to the number of probes 30 in the plug body 22 and positioned for alignment with probes 30 in a conventional manner. Bores 72 extend up to the front end face 73 of the receptacle body. An alignment bore 74 is also provided in end face 73 for receiving alignment pin 35 of the plug. A plurality of fiber-optic and/or electrical leads will be extended through a central through bore 76 in the shell 67, and into guide sleeves 77 in each of the respective through bores 72 in the receptacle body. FIG. 3 illustrates the termination of one optical fiber lead 78 by way of example. Lead or fiber 78 is terminated in a ferrule 79 within bore 72. A ceramic split sleeve 80 projects forwardly from the end of ferrule 79 to form a socket or receptacle within the bore 72 for receiving a respective one of the probes 30.

Guide sleeve 77 is sealed in through bore 72 by a pair of O-ring seals 82, and has a reduced diameter portion extending out of bore 72 through an end plate 83, which is captured in place between end wall 85 and retainer ring 87, and into a fiber boot seal 84, so that the terminated end of fiber 78 is completely sealed within bore 72. The receptacle body 20 has a reduced diameter forward end portion 86 which projects forwardly out of the enlarged open end of the coupling sleeve 66. The end portion 86 is dimensioned for fitting into the counterbore 32 in the forward end of the plug body. The coupling sleeve has an internally threaded portion 88 dimensioned for threaded engagement over the threaded end portion 52 of the plug body. An O-ring seal 89 is mounted in an annular shoulder 90 of the plug body for engagement with the outer end face 91 of the plug body when the parts are fully mated together, as best illustrated in FIG. 5.

In order to connect the plug body 22 with the receptacle body 20, and thereby connect all optical fibers 28 secured in the plug body with corresponding optical fibers 78 in the receptacle body, as well as any electrical leads in the plug body with corresponding electrical leads in the receptacle body, the two parts are first brought together with their end faces in alignment such that the alignment pin 35 engages in the end of alignment socket 74. With the parts in the proper relative orientation, each probe 30 should enter the corresponding socket 80. As the plug and socket bodies are urged axially towards one another, the coupling sleeve 66 will engage over the threaded end portion 56 of the plug body. The sleeve 66 is rotated in order to draw the probes fully into the respective sockets or sleeves 80 until the end face of each ferrule or probe terminal 30 is in face-to-face engagement with the corresponding end face of ferrule or socket terminal 79. In order to fully mate each probe or ferrule 30, the ferrule and attached guide sleeve must be pushed partially inwardly into the corresponding plug bore, compressing spring 44 and sliding the sleeve 36 through the respective seal assembly 42, as illustrated in FIG. 5. This was difficult to achieve in prior plug and socket connectors where O-ring seals were provided on the fiber or electrical lead guide sleeves. O-ring seals create too much drag to allow such relative sliding movement to be accomplished easily. In contrast, the Morrison-type seal 46 as used in this invention does not create much drag on the guide sleeve or shaft, allowing it to be pushed in easily.

Although the Morrison-type seal does allow the guide sleeve to be pushed through it relatively easily, it still provides a good seal and will resist ingress of high pressure seawater into the joint. This is because of the pre-set compression of the seal material both radially inwardly and radially outwardly, creating a relatively large pressure independent radial sealing force in both the outward and inward direction at the junction between the outer diameter of the seal and the inner diameter of bore 26, and at the junction between the inner diameter of the seal and the outer surface of guide sleeve 36. If seawater should enter the plug body via the rear end, due to failure of seals or cables elsewhere in the circuits, it will be unable to leak past the Morrison-type seal 46. This is because the seawater will create an equal pressure in both directions on the seal, at both the outside of the seal and the inside of the seal, and these pressures will cancel out to reduce the risk of either seal surface lifting away from the underlying or overlying part. Thus, this seal assembly provides a reliable seal on the guide sleeve while still allowing the probes to be pushed inwardly through the seal on making the connection.

Figure 5:
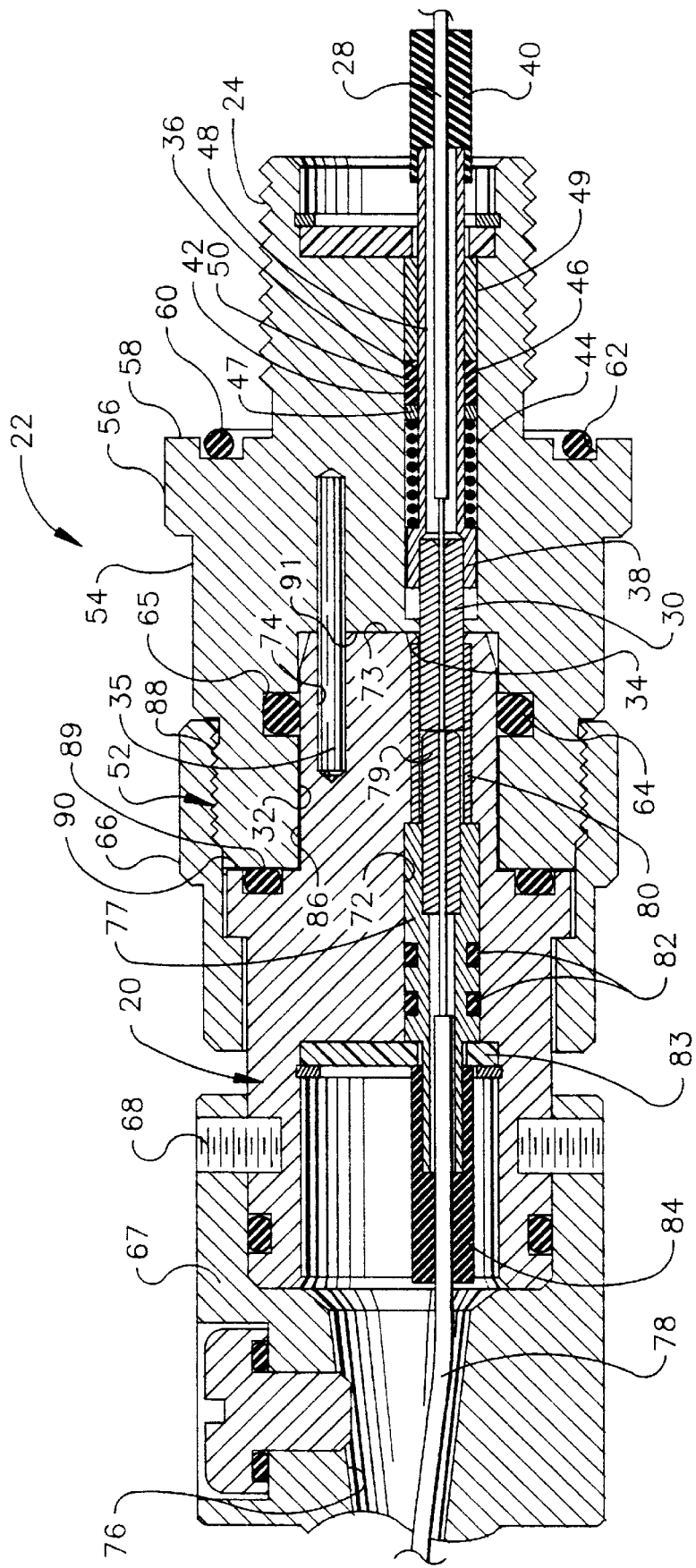
FIG. 5 is a longitudinal cross-sectional view of the plug and socket body in the fully mated condition.

When the plug and socket bodies are fully mated together as in FIG. 5, the spring 44 will bias the end face of each probe ferrule against the end face of the corresponding ferrule 79, so that the exposed fiber ends are in contact and a good optical connection is made. The seal assembly 42 of this invention allows this connection to be made readily without any drag as the probes are forced inwardly into the respective bores, while at the same time maintaining good sealing engagement with the respective bore and sleeve surfaces.

Although the Morrison-type seal and spring are provided on the probe in the plug body in the illustrated embodiment, it will be understood that alternative embodiments may be provided in which the receptacles or sockets, rather than the probes, are resiliently mounted to provide the desired adjustability and spring compression when mated. In this case, the O-ring seals 82 will be provided on the probe sleeves 36 rather than receptacle sleeves 77, and the spring 44 and seal assembly 42 will be mounted on receptacle sleeve 77 in an identical manner to that illustrated in FIG. 1. The same sealing engagement and freedom of movement will be provided for the sockets in this case, and the sockets will be pushed inwardly by the probes on mating of the two bodies. Still another option is to use the Morrison-type seals on both the plug pins and the receptacle sockets, thereby allowing maximum compliance in both connector halves.

Adaptation of the connector for underwater mating is done by pre-filling the cavity 92 formed by the interior of receptacle alignment sleeve 80, and the cavity 93 defined by the plug bore 32 with a dielectric, optical index-of-refraction matching gel. Prior to gel filling, O-ring 64 is removed from the plug to prevent hydraulic locking during engagement. The gel keeps the optical elements clean and protected from the environment until mating. When mated, the excess gel is forced out of the area between the mating connector halves. The resulting gel-filled interface is finally sealed from the outside environment when mating is completed, at which time O-ring 89 seals to face 91.

Although some preferred embodiments of the invention have been described above by way of example only, it will be understood by those skilled in the field that modifications may be made to the disclosed embodiments without departing from the scope of the invention, which is defined by the appended claims.

We claim:

1. An underwater connector assembly, comprising:
   a plug unit having at least one first bore having a predetermined inner diameter;

a receptacle unit releasably mateable with the plug unit and having at least one second bore and at least one socket mounted in the second bore;

a shaft slidably mounted in the first bore and having opposite first and second ends, the shaft having a cylindrical outer surface having a predetermined outer diameter less than the inner diameter of the first bore;

a probe secured to the second end of the shaft and projecting out of a forward end of the first bore for extending into the second bore of the receptacle unit when the two units are mated together;

the shaft and probe being slidable between a first, extended position when the units are in an unmated condition and a second position spaced rearwardly from the extended position when the units are mated together;

a spring in the first bore biasing the shaft and probe towards the extended position; and an annular seal of resilient material mounted in said first bore rearwardly of said probe in both the mated and unmated conditions of said units, said annular seal being mounted over the shaft between the shaft and first bore for sealing the first bore, the seal having a cylindrical inner surface for engagement over the cylindrical outer surface of the shaft, and having an inner diameter less than the outer diameter of the shaft and outer diameter greater than the first bore inner diameter when in an unstressed condition, whereby the seal is compressed in both directions on mounting on the shaft within the first bore, and the shaft being movable through the seal between the first and second positions on mating of the plug and receptacle units while maintaining sealing engagement between the seal and shaft.

2. The assembly as claimed in claim 1, wherein the seal is a Morrison-type seal.

3. The assembly as claimed in claim 1, wherein the seal is of rubber material.

4. The assembly as claimed in claim 1, wherein the shaft comprises a sleeve and a lead extends through the sleeve and is terminated in the first bore.

5. The assembly as claimed in claim 4, wherein the lead is an optical fiber.

6. The assembly as claimed in claim 1, wherein the shaft has an enlarged head at the forward end of said first bore and said probe is secured to said enlarged head to project out of said one end of said first bore, and a stop member is mounted at the opposite end of the first bore, said spring is mounted over said shaft adjacent said head, and said seal is located between said spring and said stop member.

7. The assembly as claimed in claim 6, including a first annular bushing between said seal and spring.

8. The assembly as claimed in claim 7, including a second, cylindrical bushing between said seal and said stop member.

9. The assembly as claimed in claim 1, wherein said seal is a solid, continuous cylindrical member having a smooth cylindrical inner surface, a smooth cylindrical outer surface, and flat annular end faces extending between said inner and outer surfaces, said first bore has a smooth cylindrical surface against which the outer surface of said seal engages, and said shaft has a smooth cylindrical outer surface over which the inner surface of said seal engages.

10. An underwater connector assembly, comprising:

a plug unit having at least one first bore having a forward end and a rear end;

a receptacle unit releasably mateable with the plug unit and having at least one second bore and at least one socket mounted in the second bore;

a shaft slidably mounted in the first bore and having opposite first and second ends, the shaft having a continuous, smooth cylindrical outer surface having an outer diameter less than the first bore diameter to form an annular chamber between the shaft and first bore;

a probe secured to the second end of the shaft and projecting out of the forward end of the first bore for extending into the second bore of the receptacle unit when the two units are mated together:

the shaft and probe being slidable between a first, extended position when the units are separated in an unmated condition and a second position spaced rearwardly from the extended position when the units are mated together;

a spring in the first bore biasing the shaft and probe towards the extended position; and annular seal of resilient material mounted in said annular chamber rearwardly of said probe in both the unmated and mated conditions of said units and between the shaft and first bore for sealing the first bore, the annular seal in an unstressed condition having an inner diameter less than the outer diameter of the shaft and outer diameter greater than the first bore diameter, whereby the seal is compressed in both directions on mounting on the shaft in the first bore, the seal having a smooth inner sealing surface for sealing engagement with the smooth outer surface of the shaft whereby the shaft is slidable relative to the seal between the first and second positions on mating of the plug and receptacle units while maintaining sealing engagement between the seal and shaft.

11. The assembly as claimed in claim 10, wherein the seal is a Morrison-type seal.

12. The assembly as claimed in claim 10, wherein said probe projecting outwardly from the forward end of the first bore, and the spring is mounted in said annular chamber between said probe and said seal for biasing said probe in an outward direction.

13. The assembly as claimed in claim 12, including a first bushing mounted between said seal and said spring, and a second bushing mounted in said annular chamber between said seal and the rear end of said first bore, whereby said bushings and seal fill said annular chamber between said spring and first bore rear end.

14. The assembly as claimed in claim 12, wherein said shaft comprises a hollow sleeve projecting out of the rear end of said first bore, and a lead projects through said sleeve and is terminated at said probe, the sleeve being sealed to said lead.

15. The assembly as claimed in claim 14, wherein said lead comprises an optical fiber.

16. An underwater connector assembly, comprising:

a plug unit having at least one first bore and at least one probe terminal mounted in the first bore;

a receptacle unit releasably mateable with the plug unit and having at least one second bore and at least one socket terminal mounted in the second bore for receiving the probe terminal when the two units are mated together;

each bore having a forward end facing the other bore when the units are mated together;

one of said terminals being slidably mounted in the respective bore;

a shaft having a first end secured to said one terminal and extending from said one terminal rearwardly through the respective bore, the shaft having a continuous, smooth cylindrical outer surface having an outer diameter less than the diameter of the respective bore through which said shaft extends to form an annular chamber between the shaft and the respective bore rearwardly of said one terminal;

the shaft and said one terminal being slidable between a first, extended position when the units are separated and a second position spaced rearwardly from the extended position when the units are mated together;

a spring biasing the shaft and said one terminal towards the extended position; and an annular seal of resilient material mounted in said annular chamber between the shaft and respective bore for sealing the respective bore, the annular seal having an inner diameter less than the outer diameter of the shaft and an outer diameter greater than the respective bore diameter, whereby the seal is compressed in both directions on mounting on the shaft in the respective bore, the seal having a smooth inner sealing surface for sealing engagement with the smooth outer surface of the shaft whereby the shaft is slidable relative to the seal between the first and second positions on mating of the plug and receptacle units while maintaining sealing engagement between the seal and shaft.

* * * * *